US005615835A

United States Patent [19]

Nelson

[11] Patent Number: 5,615,835

[45] Date of Patent: Apr. 1, 1997

[54] TRIGGER SPRAYER HAVING DISC VALVE

[75] Inventor: Philip L. Nelson, Ellisville, Mo.

[73] Assignee: Contico International, Inc., St. Louis, Mo.

[21] Appl. No.: 456,511

[22] Filed: Jun. 1, 1995

Related U.S. Application Data

[60] Continuation of Ser. No. 372,061, Jan. 12, 1995, Pat. No. 5,509,608, which is a division of Ser. No. 964,158, Oct. 21, 1992, Pat. No. 5,385,302, which is a continuation-in-part of Ser. No. 603,281, Oct. 25, 1990, Pat. No. 5,234,166.

[51] Int. Cl.[6] .............................. B05B 11/00; F16K 15/14

[52] U.S. Cl. ........................ 239/333; 222/383.1; 239/571; 137/854

[58] Field of Search ............................ 239/333, 569–571; 222/383.1, 207, 341; 137/843, 852, 854

[56] References Cited

U.S. PATENT DOCUMENTS

| | | | |
|---|---|---|---|
| Re. 33,235 | 6/1990 | Corsette . | |
| 3,726,442 | 4/1973 | Davidson et al. . | |
| 3,840,157 | 10/1974 | Hellenkamp . | |
| 3,843,025 | 10/1974 | Holt . | |
| 3,986,644 | 10/1976 | Grogan et al. . | |
| 3,987,938 | 10/1976 | Cooprider et al. . | |
| 4,082,223 | 4/1978 | Nozawa . | |
| 4,088,248 | 5/1978 | Blake . | |
| 4,138,038 | 2/1979 | Grogan . | |
| 4,155,487 | 5/1979 | Blake . | |
| 4,174,069 | 11/1979 | Grogan . | |
| 4,201,317 | 5/1980 | Aleff . | |
| 4,204,614 | 5/1980 | Reeve . | |
| 4,225,061 | 9/1980 | Blake et al. . | |
| 4,241,853 | 12/1980 | Pauls et al. . | |
| 4,358,057 | 11/1982 | Burke . | |
| 4,435,135 | 3/1984 | Knickerbocker . | |
| 4,471,893 | 9/1984 | Knickerbocker . | |
| 4,527,594 | 7/1985 | Garneau . | |
| 4,527,741 | 7/1985 | Garneau . | |
| 4,618,077 | 10/1986 | Corsette . | |
| 4,640,444 | 2/1987 | Bundschuh . | |
| 4,669,664 | 6/1987 | Garneau . | |
| 4,728,009 | 3/1988 | Schmidt . | |
| 4,867,740 | 9/1989 | East | 137/854 |
| 4,936,493 | 6/1990 | Foster et al. . | |
| 4,944,431 | 7/1990 | Blake . | |
| 5,014,881 | 5/1991 | Andris . | |
| 5,169,032 | 12/1992 | Steijns et al. . | |
| 5,228,602 | 7/1993 | Maas et al. . | |
| 5,234,166 | 8/1993 | Foster et al. . | |
| 5,271,432 | 12/1993 | Gueret | 137/854 |
| 5,297,701 | 3/1994 | Steijns et al. . | |
| 5,318,206 | 6/1994 | Maas et al. . | |
| 5,326,237 | 7/1994 | Cecil et al. . | |
| 5,332,128 | 7/1994 | Maas et al. . | |
| 5,332,157 | 7/1994 | Proctor | 239/333 |
| 5,341,965 | 8/1994 | Maas et al. . | |
| 5,385,302 | 1/1995 | Foster et al. . | |
| 5,401,148 | 3/1995 | Foster et al. . | |

FOREIGN PATENT DOCUMENTS

| | | |
|---|---|---|
| 0369125 | 5/1990 | European Pat. Off. . |
| 2416056 | 8/1979 | France . |
| 54-104015 | 8/1979 | Japan . |
| 54-136408 | 10/1979 | Japan . |
| 2002516 | 11/1993 | Russian Federation . |
| 2013774 | 8/1979 | United Kingdom . |

*Primary Examiner*—Andres Kashnikow

*Attorney, Agent, or Firm*—Howell & Haferkamp, L.C.

[57] ABSTRACT

A low cost trigger sprayer has a housing with a first liquid passage containing a spinner assembly. An elastomeric pump element is positioned generally horizontally such that pulling the trigger retracts the element and releasing the trigger allows the element to extend. The sprayer includes a low cost spinner assembly and low cost valving to control the flow of liquid within the sprayer. In one aspect of the invention, the housing has front and rear sections with the rear section having a saddle portion and being hinged to the front section for pivotal movement from an open position for molding the housing to a closed position for operating the sprayer. In another aspect of the invention, the container has a rear portion which extends upwardly past the neck and defining a saddle recess, with the housing connected to the neck of the container and positioned forwardly of the upwardly extending container portion. The sprayer may include an elastomeric spring for biasing the pump element in the extended position.

18 Claims, 7 Drawing Sheets

TRIGGER SPRAYER HAVING DISC VALVE

This application is a continuation application of U.S. patent application Ser. No. 08/372,061 filed Jan. 12, 1995, which issued as U.S. Pat. No. 5,509,608 currently entitled "Low Cost Trigger Sprayer having Spinner with Integral Elastomeric Check and Primary Valves" which was a divisional application of U.S. patent application Ser. No. 07/964,158 filed Oct. 21, 1992, which issued as U.S. Pat. No. 5,385,302 entitled "Low Cost Trigger Sprayer" on Jan. 31, 1995, which was a continuation-in-part of U.S. patent application Ser. No. 07/603,281 filed Oct. 25, 1990, which issued as U.S. Pat. No. 5,234,166 entitled "Spinner Assembly for a Sprayer" on Aug. 10, 1993.

BACKGROUND OF THE INVENTION

This invention is directed to the field of trigger dispensers, also known as trigger sprayers. The invention is particularly directed to such a sprayer having unique features that reduce the cost of the sprayer.

Generally, a trigger dispenser of the type involved here is a relatively low cost pump device which is held in the hand and which has a trigger operable by squeezing or pulling the fingers of the hand to pump liquid from a container and through a nozzle at the front of the dispenser.

Such trigger dispensers may have a variety of features that have become common and well-known in the industry. For example, the dispenser may be a dedicated sprayer that produces a defined spray pattern for the liquid as it is dispensed from the nozzle. It is also known to provide adjustable spray patterns such that with a single dispenser the user may select any one of several stream patterns from a stream to a fine mist. Some known trigger dispensers also include a way to seal the dispenser to prevent liquid from leaking from the nozzle orifice during shipment or non-use. A variety of sealing arrangements are known. It is also well-known to provide trigger dispensers with a means to produce foaming of the liquid as it is dispensed from the nozzle orifice. Such trigger dispensers are generally referred to in the industry as "foamers". Various types of foamers are well-known.

While trigger sprayers of the type to which the present invention is directed are of relatively low cost, the various aspects of the present invention serve to further reduce costs, while at the same time providing versatility in design and reliable service. To put this into perspective, millions of trigger sprayers are sold each year for use in dispensing a wide variety of products. Because of the large volumes, a savings of only a few cents, or even one cent, is significant.

So the objective of the present invention is to provide a trigger sprayer with cost-saving features relative to those presently in the marketplace while maintaining acceptable performance criteria.

SUMMARY OF THE INVENTION

One aspect of the invention relates to the structure and composition of the pump element as used in combination with other trigger sprayer components in a specific manner. In accordance with this aspect of the invention a trigger sprayer assembly is provided which has a housing with a first liquid passage extending generally horizontally and with a valve seat at the rear end of the passage. A spinner assembly is located within the liquid passage, the spinner assembly having a valve portion, a spinner head, and a spring portion between the valve portion and spinner head.

The spinner head normally biases the valve portion against the valve seat to close the passage to the flow of liquid, the valve portion and valve seat comprising the primary valve of the assembly. A nozzle assembly is secured to the housing at the front of the first passage and has an orifice for dispensing the liquid. A trigger is secured to the housing such that pulling and releasing the trigger operates the sprayer assembly.

The sprayer assembly has a horizontally disposed pump element secured to the housing and where the pump element is elastomeric with a chamber therein. Pulling the trigger retracts the elastomeric element and releasing the trigger allows it to extend, the elastomeric element being resilient and configured to normally maintain its extended condition but retractable upon application of force against its resilience. The housing further has a socket for receiving the upper end of a dip tube, and an opening for the passage of liquid from the dip tube into the pump element chamber.

Further in accordance with this aspect of the invention, there is provided an elastomeric valve member which seals against the opening under positive pressure within the pump element chamber but which unseals under negative pressure. The housing has a second liquid passage for the flow of liquid from the chamber to the first liquid passage upon retraction of the elastomeric pump element.

Hence, in accordance with this aspect of the invention, pulling the trigger retracts the elastomeric pump element creating positive pressure within the chamber to seal the opening and force liquid within the chamber through the second liquid passage then to the first liquid passage and then through the orifice. Releasing the trigger allows the elastomeric pump element to extend by its resilience creating negative pressure in the chamber to unseal the opening and draw liquid from the dip tube and into the chamber and allowing the primary valve to close. The generally horizontally oriented elastomeric pump element in combination with the generally horizontally extending first liquid passage containing the spinner assembly, together with the other housing and valving features, provide a trigger sprayer with fewer parts, less expensive parts, and one which is less costly to make, while maintaining the performance characteristics desirable in such a sprayer.

The elastomeric valve member may be either a bulb or bellows, and preferably there is also provided means for venting the container without leakage. The housing of the sprayer assembly also is provided with a connector for connecting the housing to the neck of a container, where the connector may be either a threaded closure or of the bayonet type. In the case of the bayonet type, the entire housing, including the connector portion, preferably is integrally formed.

In accordance with another aspect of the invention to provide significant cost savings, the housing of the trigger sprayer assembly has front and rear sections with the rear section having a saddle portion for ergonomically receiving the web of the hand between the thumb and first finger upon operation of the assembly. The rear section of the housing is hinged to the front section for pivotal movement from an open position for molding the housing, to a closed position for operation of the trigger sprayer assembly. Means are provided for locking the rear section of the housing in the closed position. The entire housing, including the rear section and hinge, are integrally formed.

Where the connector portion for connecting the housing to a container is a closure member formed separately from the housing and rotatable relative thereto, the closure member may serve to lock the rear portion of the housing in the closed position with the closure member secured to the housing. Where the connector portion is integrally formed with the housing, it has means for engaging the rear section of the housing to lock it in the closed position.

In another aspect of the invention, the trigger sprayer assembly and container to which it is connected combine to provide significant cost savings as well as flexibility in overall design. The container has a rear portion which extends upwardly from the top of the container past its neck. The housing of the trigger sprayer assembly is connected to the neck of the bottle with the housing being positioned forwardly of the upwardly extending bottle portion. The upwardly extending bottle portion defines a saddle recess for ergonomically receiving the web of the hand between the thumb and first finger upon operation of the trigger sprayer assembly. So in this aspect of the invention, the trigger sprayer assembly provides all the operating mechanism for pumping the liquid from the container and dispensing it through the nozzle orifice, while the container provides the saddle recess for the web of the hand between the thumb and the first finger and thereby combines with the trigger sprayer assembly to provide a structure for holding and operating the assembly. The trigger sprayer and bottle also combine to provide great versatility in overall design by changing the bottle configuration without changing the trigger sprayer assembly configuration. Hence, the same basic sprayer assembly configuration may be used with a wide variety of bottle designs to provide a wide variety of overall design appearances.

In a preferred form of this aspect of the invention, the housing has a rear surface and the upwardly extending rear portion of the container has a front surface, these two surfaces being in facing relationship and substantially congruent. Also preferably, the connector portion of the assembly is integrally formed with the housing, and engagement of the connector portion with the neck of the container is of the bayonet type.

In another aspect of the invention, cost saving is achieved through the design and configuration of the check valve. The housing has a socket for receiving the upper end of the dip tube, and further has an opening for the passage of liquid from the dip tube into the pump element chamber. A check valve blocks the passage of liquid through the opening under positive pressure within the chamber but allows the flow of liquid through the opening under negative pressure. A cavity extends between the dip tube socket and the primary valve of the assembly. An elastomeric plug is located within the cavity and has an elastomeric valve member formed integrally therewith at one end thereof with the valve member normally seated within a valve seat. The valve member and valve seat define the check valve. The plug and the wall of the cavity define a second passage for the flow of liquid from the pump element chamber to the primary valve. The plug has a portion which seals the cavity and blocks the direct flow of liquid from the check valve to the second liquid passage. The integrally-formed elastomeric plug and valve member provide cost savings through fewer parts, ease in manufacture and assembly, and inexpensive material.

Also in accordance with this aspect of the invention, the check valve may be of an alternate configuration comprising a separately-formed valve seat member within the cavity and defining a vertically-oriented valve seat. Further included is a ball valve normally seated within the valve seat such that the ball valve and valve seat define the check valve. Both the valve seat member and ball may be made of inexpensive plastic material, and are easily assembled in the housing.

In another aspect of the invention the spinner assembly comprises an elongated element integral with the housing and extending through a first liquid passage formed in the housing. The elongated element has a swirl chamber at the front end thereof adjacent the nozzle orifice. Valve means control the flow of liquid upon actuation of the trigger to pump liquid from the container and dispense it from the nozzle orifice.

The pump element may be elastomeric with the housing having a second liquid passage for the flow of liquid from the elastomeric pump element to the first liquid passage and a third liquid passage for the flow of liquid from the container to the elastomeric pump element. A first valve element is formed integrally with the elastomeric pump element to control the flow of liquid through the second passage, and a second valve element is formed integrally with the elastomeric pump element to control the flow of liquid through the third passage. The first valve element opens and the second valve element closes in response to contraction of the elastomeric pump element to pump liquid from the elastomeric pump element, through the second and first passages, and to the nozzle orifice. The first valve element closes and the second valve element opens in response to extension of the elastomeric pump element to draw liquid from the container, through the third passage, and to the pump element. In a more specific form of the invention, the first and second valve elements comprise resilient flaps formed integrally at the rear of the elastomeric pump element, the flaps overlying openings in the second and third passages. The elastomeric pump element may be a bulb. The housing may have a vent opening communicating the interior of the container with atmosphere, and the elastomeric pump element may have a sealing portion which seals the vent opening with the pump element in the extended position, but which unseals the vent opening with the pump element in the retracted position to vent the container.

The present invention also is directed to improvements in the spinner assembly itself. In one aspect the spinner assembly comprises an elongated body portion having a swirl chamber at a front end thereof, and a flexible elastomeric valve portion at the rear thereof. The spinner assembly is adapted to be housed within a liquid discharge cavity of a trigger sprayer housing with the valve portion overlying an opening in the cavity and defining a primary valve to the trigger sprayer. The valve portion may comprise a flexible disc, and the rear of the elongated body portion may be formed in an axial hub with the disc attached at its center to the hub. The entire spinner assembly may be of integral molded construction.

The spinner assembly may further comprise a second flexible valve portion formed at the rear of the spinner assembly and adapted to overlie another opening in the housing to define a check valve for the sprayer, the main body portion and valve portions being integrally molded.

In another aspect the spinner assembly may comprise a spinner head having a swirl chamber at the front end thereof, a valve portion adapted to seat against a valve seat in the housing of the trigger sprayer, and a spring portion for biasing the valve portion against the valve seat. The spinner head has means for locking the spinner head within a liquid discharge cavity of the trigger sprayer housing to prevent longitudinal movement of the spinner head relative to the housing. In this way the position of the spinner head relative to the nozzle orifice is fixed so that precise spray characteristics are maintained.

A more detailed description of the various embodiments and aspects of the invention is set out below.

DETAILED DESCRIPTION OF PREFERRED EMBODIMENTS

Figure 1:
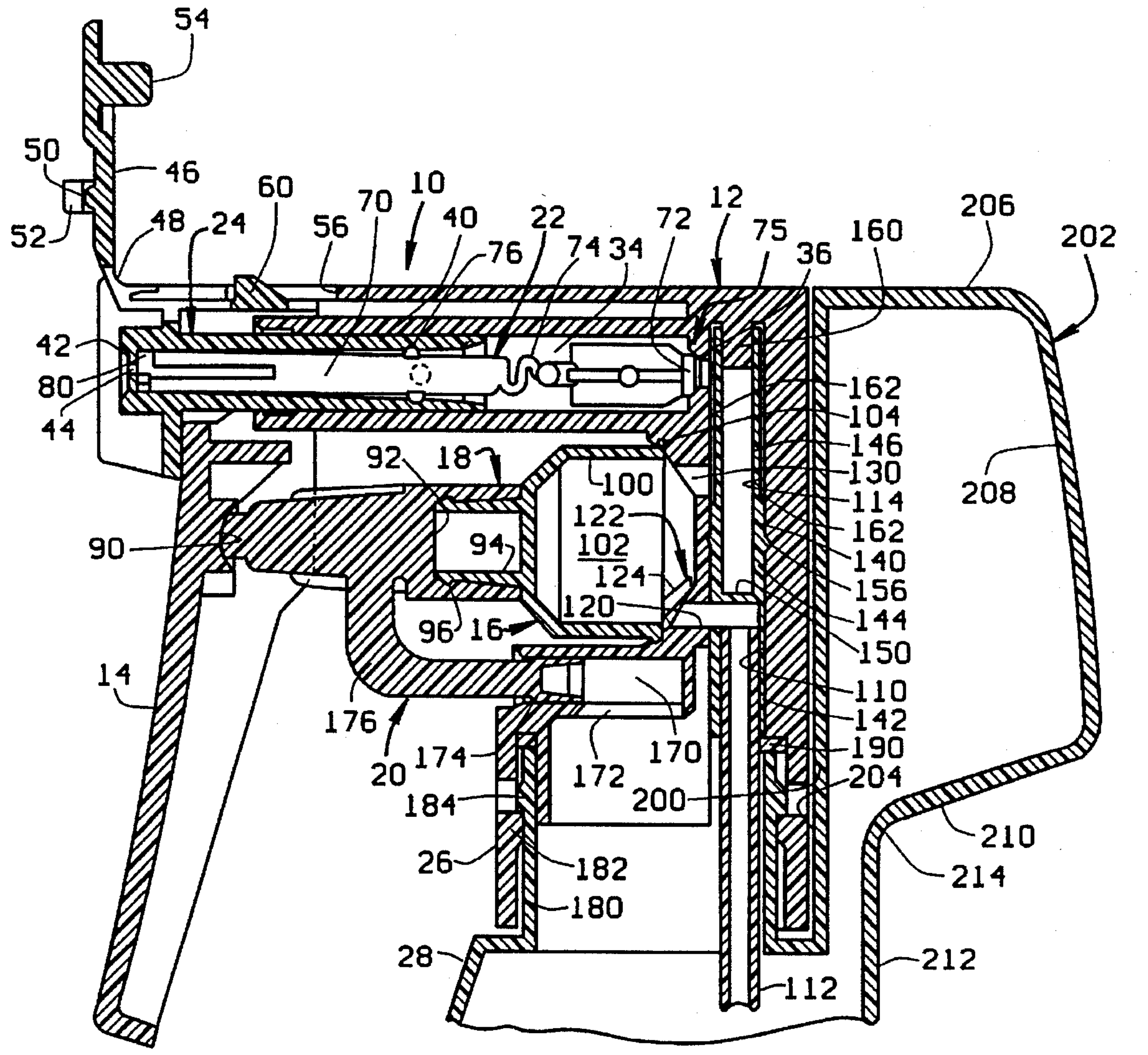
FIG. 1 is a view in section depicting an embodiment of a trigger sprayer of the present invention.

With reference to FIG. 1 of the drawing, there is shown a trigger sprayer assembly 10 of a first embodiment of the invention. The assembly includes a housing 12, a trigger 14 mounted to the housing for actuation relative to the housing, a pump element 16, a plunger 18 between the trigger and pump element, a vent assembly 20, a spinner assembly 22, a nozzle assembly 24 at the front of the housing, and a connector 26 for connecting the trigger sprayer assembly to a container 28.

The housing 12 has a generally horizontal barrel portion having a generally horizontal cavity 34 therein with a valve seat 36 at the rear end thereof. The nozzle assembly 24 is mounted in the front end of the cavity and has a barrel portion 40 extending within the cavity. The nozzle assembly has a front wall 42 with an orifice 44 through which liquid in the container is dispensed upon operation of the trigger sprayer assembly. The nozzle assembly also has a door 46 hinged at 48 by means of a living hinge. The door has a knob 50 which seats within the orifice 44 when the door is closed (pivoted downwardly) to prevent liquid from leaking from the orifice. The door has suitable latching means 52 for holding the door closed. The door also has a tab 54 which seats within an opening 56 in the top of the housing when the door is pivoted to its stored position (see FIG. 3) to in effect hold the door open. This last described feature is optional because the door will stay in the position shown in FIG. 1 if it is not latched in the closed position so that during operation of the trigger sprayer assembly the door does not interfere with the dispensing of the liquid. The nozzle assembly further has a tab 60 which engages in the opening 56 to lock the nozzle to the housing in the position shown in FIG. 1.

The spinner assembly 22 is located within the first liquid passage 34 and includes a spinner head portion 70, a valve portion 72, and a spring portion 74 between the spinner head and valve portion for biasing the valve portion against the valve seat 36. The valve portion 72 and valve seat 36 define a primary valve 75. The spinner head 70 has an annular ring 76 that fits within a complementary annular groove in the wall of the nozzle assembly to lock the spinner head within the tubular portion of the nozzle assembly to prevent relative longitudinal movement therebetween. This assures that the spinner face 80 of the spinner head always remains at a fixed distance relative to the orifice 44 to assure a constant spray pattern. The spinner face is of the conventional type having a spinner recess for generating in combination with the orifice the desired spray characteristics.

The trigger 14 is mounted to the housing for actuation relative to the housing by the fingers of the hand. In this embodiment, the trigger is pivotally mounted at its upper end to the forward portion of the housing and has a rounded socket for receiving the forward rounded end of the plunger 18. The rear end of the plunger has a socket 92. The pump element 16 is elastomeric and has a forward projecting portion 94 having an annular ring 96 that seats within a complementary annular recess within the socket 92 for securing the pump element to the plunger. The pump element also has a bulb portion 100 defining a pump chamber 102 therein. The bulb portion is generally circular about its longitudinal axis and has a rear annular flange 104 engaged within a complementary annular groove within the housing for securing the elastomeric pump element to the housing.

The housing has a socket portion 110 into which the upper end of a dip tube 112 extends, the dip tube directing liquid from the container 28 into the trigger sprayer assembly upon operation of the assembly. At the upper end of the socket 110 is a cavity portion 114 within the housing. The housing also has a passage 120 extending from the cavity to a check valve 122. The check valve 122 comprises a valve seat at the end of the cavity 120, and a valve member 124 which, in this embodiment of the invention, is an elastomeric flap element formed integrally with the elastomeric pump element 16. When the pump element is contracted or collapsed creating positive pressure within the chamber 102, the valve element 124 seals the passage 120 against the flow of liquid into the chamber, but when the elastomeric pump element extends, creating negative pressure within the chamber 102, the valve element 124 unseals the passage 120 allowing the flow of liquid from the container into the chamber by way of the dip tube.

The housing also includes an opening 130 from the chamber to the cavity portion 114. A plug 140 is housed within the socket portion 110 and cavity 114, the plug having a lower tubular portion 142 within the socket 110 with the upper end of the dip tube received within the lower tubular portion 142. The plug also has an intermediate tubular portion 144 and an upper tubular portion 146. At the base of the intermediate tubular portion 144 is a wall 150 just above the passage 120 to block the flow of liquid from the dip tube directly to the primary valve 75. The intermediate portion 144 has an annular shoulder 156 that seats within a complementary annular groove in the wall of the housing to lock the plug within the cavity, the intermediate portion 144 being in sealing engagement with the wall of the cavity to prevent the direct flow of liquid from the dip tube to the primary valve. The upper portion 146 of the plug engages a depending neck portion 160 of the housing to secure the upper end of the plug. The upper end portion 146 is spaced from the wall of the cavity 114 to define with the opening 130 a second liquid passage 162 for the flow of liquid from the chamber 102 to the primary valve 75.

The housing also includes a portion extending beneath the pump element and defining a cylindrical chamber 170 with a vent slot 172 extending longitudinally in the wall of the vent chamber at the bottom thereof. A vent piston 174 reciprocates within the cylindrical chamber 170 in sealing engagement therewith. The vent assembly 20 also has a vent arm 176 formed integrally with the plunger and extending from the main portion of the plunger to the vent piston 174 such that reciprocating movement of the plunger also produces reciprocating movement of the piston. With the trigger 14 in the released position shown in FIG. 1, the vent piston 174 seals the forward end of the vent cylinder so that liquid from the container cannot escape through the slot 172 and out the forward end of the vent cylinder. With the trigger 14 pulled, the vent piston moves to a rear position (to the right as viewed in FIG. 1) to vent the slot 172 to atmosphere so that air is allowed to flow through the forward end of the vent cylinder and the vent slot into the container to prevent collapsing of the container during operation of the trigger sprayer assembly.

The housing also includes a connector portion 26 which in this embodiment of the invention is formed integrally with the housing and which connects the housing to the neck 180 of the container 28° The connector 26 of the housing and the neck 180 of the container have complementary bayonet coupling elements 182, 184 for securing the housing to the container so that the trigger sprayer housing may be snapped onto the neck of the container without requiring rotation of the trigger sprayer assembly relative to the container. A suitable gasket 190 is located between the upper end of the neck and the base of the connector to prevent leakage.

Further in accordance with this embodiment of the invention, the trigger sprayer assembly and container combine to provide the means for holding and operating the assembly to dispense the liquid from the container, and further to provide versatility in overall design using a fixed trigger sprayer assembly configuration. Thus, the housing has a rear surface 200. The container 28 has a rear section 202 which extends upwardly past the neck portion and which has a front wall 204 which faces the wall 200. In this embodiment, the walls 200, 204 are generally vertical, are in close proximity, and are congruent. The rear section 202 has an upper wall 206 generally aligned with the top of the housing, a rear wall 208, and lower walls 210, 212 which form between them a saddle recess 214 for ergonomically receiving the web of the hand between the thumb and first finger for operating the trigger sprayer assembly. The rear section of the container may be formed integrally with the neck portion.

Figure 3:
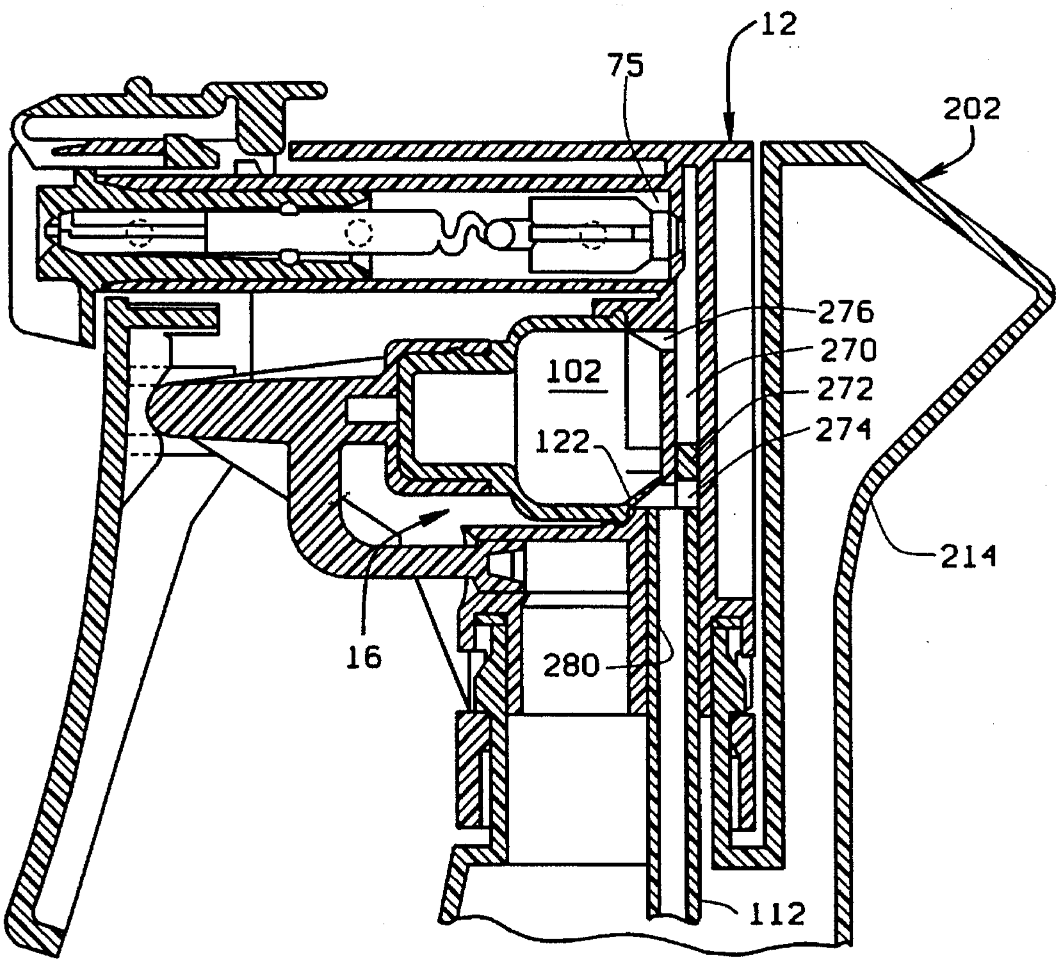
FIG. 3 is a view in section depicting another embodiment of the trigger sprayer of the present invention.
Figure 5:
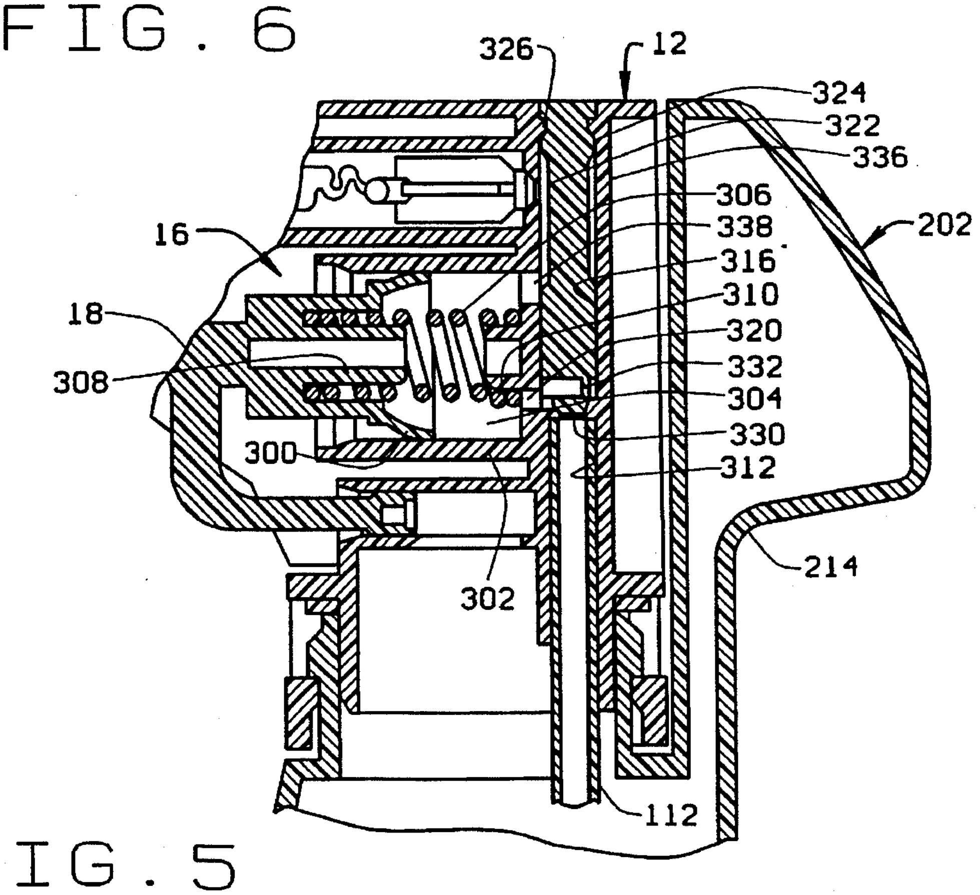
FIG. 5 is a view in section showing an alternate embodiment of a trigger sprayer according to the present invention.
Figure 7:
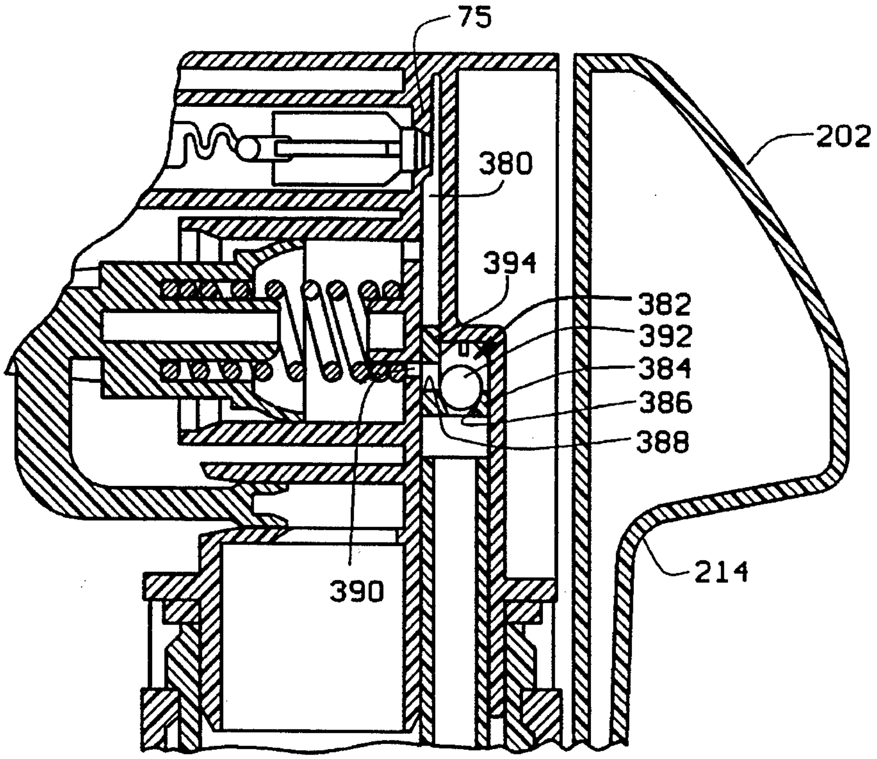
FIG. 7 is a view in section showing an alternate embodiment of the trigger sprayer of FIG. 5.

Therefore, it can be seen that with this embodiment of the invention, the trigger sprayer assembly provides the mechanism for pumping the liquid from the container and dispensing it through the orifice 44, while the container, and particularly the rear section 202 of the container, provides the saddle recess for operating the trigger sprayer assembly. Also, the overall design appearance is dictated by the combined design characteristics of the trigger sprayer assembly and the rear section 202 of the container. In this way, the overall design appearance may be changed simply by altering the configuration of the rear section 202 without altering the configuration of the trigger sprayer assembly. Examples of other design configurations are shown in FIGS. 3, 5, and 7. These are shown only by way of example as a great many overall designs may be achieved.

Figure 2:
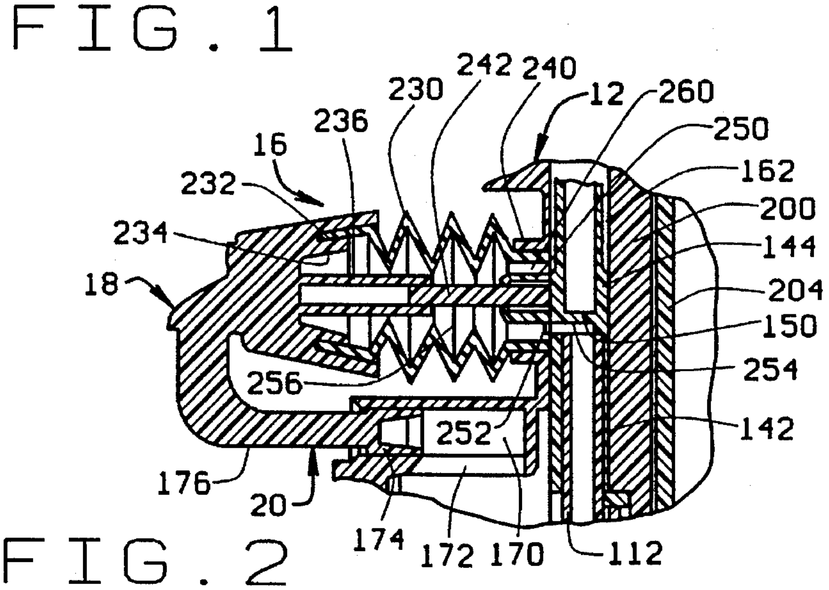
FIG. 2 is a view in section depicting a modification of the pump element of the trigger sprayer of FIG. 1.

FIG. 2 illustrates a modification of the embodiment shown in FIG. 1 where the pump element 16 has a bellows portion 230 rather than the bulb portion 100 as shown in FIG. 1. The forward end of the bellows portion 230 is secured in an annular groove 232 in the rear end of the plunger 18 which also has a recess 234 with a rearwardly extending sleeve 236. The rear end of the bellows is secured to the housing 12 within a shoulder 240. The housing has a rod 242 which extends forwardly into telescoping engagement with the sleeve 236 to give structural stability to the pump element.

A sleeve-like elastomeric valve member 250 surrounds the base of the rod as shown, and has an integrally-formed flap portion 252 which overlies an opening at the end of a passage 254 through which liquid flows from the dip tube 112 into the chamber 256 within the bellows. The flap portion 252 and opening define a check valve similar to the check valve 122 in FIG. 1. An opening 260 extends between the chamber 256 and the passage 162.

Except for these differences, the structure and operation of the embodiment of FIG. 2 is the same as that of FIG. 1.

FIG. 3 shows another embodiment of the trigger sprayer assembly of the present invention which is similar to that of FIG. 1 but with certain modifications. With this embodiment, the shape of the upwardly extending rear section 202 of the bottle is different from that of FIG. 1, but its function is the same. Also, the shape of the cavity 270 is different from that of cavity 114 in FIG. 1. The cavity 270 is narrower and extends from the top of the dip tube 112 to the primary valve 75. An elastomeric plug 272 is located between a passage 274, which leads from the upper end of the dip tube to the check valve 122, and an opening 276 which leads from the chamber 102 to the cavity 270. The plug 272 blocks the direct flow of liquid through the cavity from the top of the dip tube to the primary valve. The housing 12 has a vertical socket 280 to receive the upper end of the dip tube.

Otherwise, the structure and operation of the embodiment of FIG. 3 is the same as the embodiment of FIG. 1.

Figure 4:
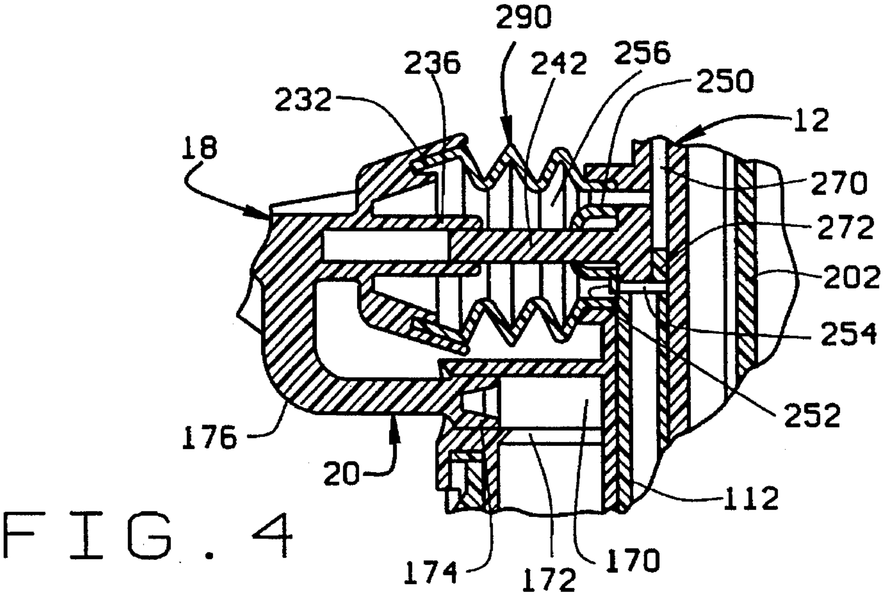
FIG. 4 is a sectional view showing an alternate pump element for the trigger sprayer of FIG. 3.

FIG. 4 illustrates a modification of the embodiment of FIG. 3 where the elastomeric pump element 16 is a bellows 290 similar to the bellows 230 of FIG. 2.

FIG. 5 illustrates another embodiment of the present invention which shows an alternate form of pump element, and an alternate form of check valve. Otherwise, the trigger sprayer assembly of this embodiment is essentially the same as those of FIGS. 1–4. In this embodiment the pump element 16 has a piston portion 300 formed integrally with the plunger 18. The housing 12 has a forwardly-extending portion 302 which defines a cylindrical chamber 304. The piston 300 reciprocates within the chamber 304 upon operation of the trigger. The piston 300 is biased to the extended position shown in FIG. 5 by a coil spring 306 mounted between a rearwardly-extending tubular portion 308 of the pump element and a forwardly-extending tubular portion 310 of the housing.

The upper end of the dip tube 112 is received in a vertical socket 312 in the housing. A cavity 316 extends from the top of the dip tube to the top of the housing and defines a valve seat at the upper end of the dip tube. An opening 320 communicates the cavity 316 with the pump element chamber.

An elastomeric plug 322 is located in the cavity and extends from the top of the housing to the valve seat. The upper end of the plug is flared at 324 which cooperates an annular shoulder 326 of the housing to lock the plug within the cavity. The top of the plug is flush with the top of the housing.

At the lower end of the plug is a disc-shaped valve member 330 which is flexibly connected to the main portion of the plug by a web 332. The entire plug, including the web 332 and valve portion 330, is integrally formed. The valve portion 330 and valve seat define a check valve. The wall of the cavity 316 and the upper portion of the plug 322 define a second passage 336 which communicates with the chamber of the pump element through an opening 338.

In operation, pulling the trigger causes the piston 300 to move rearwardly to pump liquid from the chamber, through the opening 338 and passage 336, and the primary valve, to the nozzle. The positive pressure in the chamber holds the check valve member 330 closed. Releasing the trigger allows the piston 300 to move forwardly under the spring bias, thereby reducing the pressure in the chamber and causing the check valve 330 to open so that liquid flows from the dip tube into the chamber by way of the passage 320. The middle portion of the plug 332 blocks the direct flow of liquid through the cavity 316 from the check valve to the primary valve.

Therefore, in addition to the features previously mentioned, the embodiment of FIG. 5 utilizes a relatively low cost check valve arrangement which is inexpensive to make and assemble.

Figure 6:
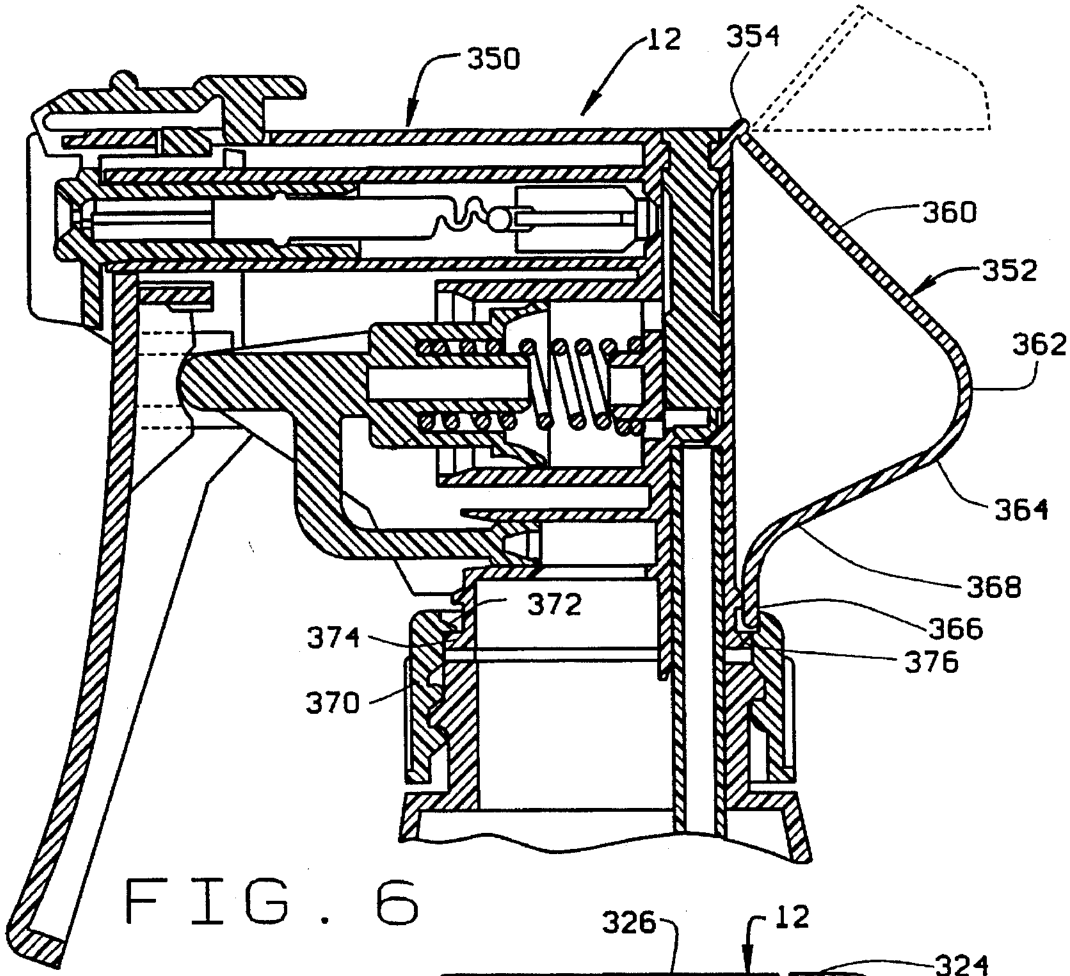
FIG. 6 is a view in section showing another alternate embodiment of the trigger sprayer of this invention.

FIG. 6 shows another embodiment of the invention which has the same pump element and check valve arrangement as shown in FIG. 5, but which uses a different structure for providing a saddle recess for the hand during operation of the trigger sprayer assembly. In accordance with the embodiment of FIG. 6, the trigger sprayer housing 12 has a front section 350 and a rear section 352 which is hinged to the front section by a living hinge 354, which in this embodiment is at the top of the housing. The housing, including the hinge 354 and rear section 352, is integrally formed with the rear section 352 molded in the position shown in dashed lines, and then assembled for operation with the rear section as shown in solid lines. As shown, the rear section 352 has a sloping wall 360, a rear hump 362, an inwardly-extending wall 364, and a tail wall 366. A saddle recess 368 is formed between the walls 364 and 366 for ergonomically receiving the web of the hand between the thumb and first finger during operation of the sprayer.

In this embodiment the sprayer housing is connected to the neck of a bottle by a threaded closure 370. The upper end of the closure has an inwardly-extending shoulder 372 which snaps over an outwardly-extending shoulder 374 of the housing. The closure has an upper notch 376 which receives the lower end of the rear section 352 to lock the rear section 352 in the closed position shown by solid lines. During assembly, the rear section 352 is pivoted about the hinge 354 to the closed position, and then the closure member 370 is snapped onto the housing to lock the rear section in the closed position as shown. Although one cross-section configuration of the rear section is shown, it is to be understood that there are many possible configurations that may be used. The trigger sprayer assembly of FIG. 6 is easy to mold and assemble which saves costs, and yet provides the desired ergonomics and aesthetics.

FIG. 7 shows an embodiment similar to FIG. 5 but with an alternate check valve assembly. As shown in FIG. 7, a cavity 380 extends from the top of the dip tube to the primary valve 75. The lower end of the cavity has a wide section that receives a check valve assembly 382. The check valve assembly includes a plastic check valve frame 384 having a vertical valve seat 386 and a side opening 388 which communicates with an opening 390 to the pump element chamber. A ball valve 392, which may be of plastic, seats within the valve seat by its own weight. The frame 386 has a integrally-formed plug portion 394 which blocks the direct flow of fluid through the cavity 380 from the check valve to the primary valve. The operation of the sprayer embodiment of FIG. 7 is the same as that of FIG. 5 except for the difference in configuration of the check valves.

Figure 8:
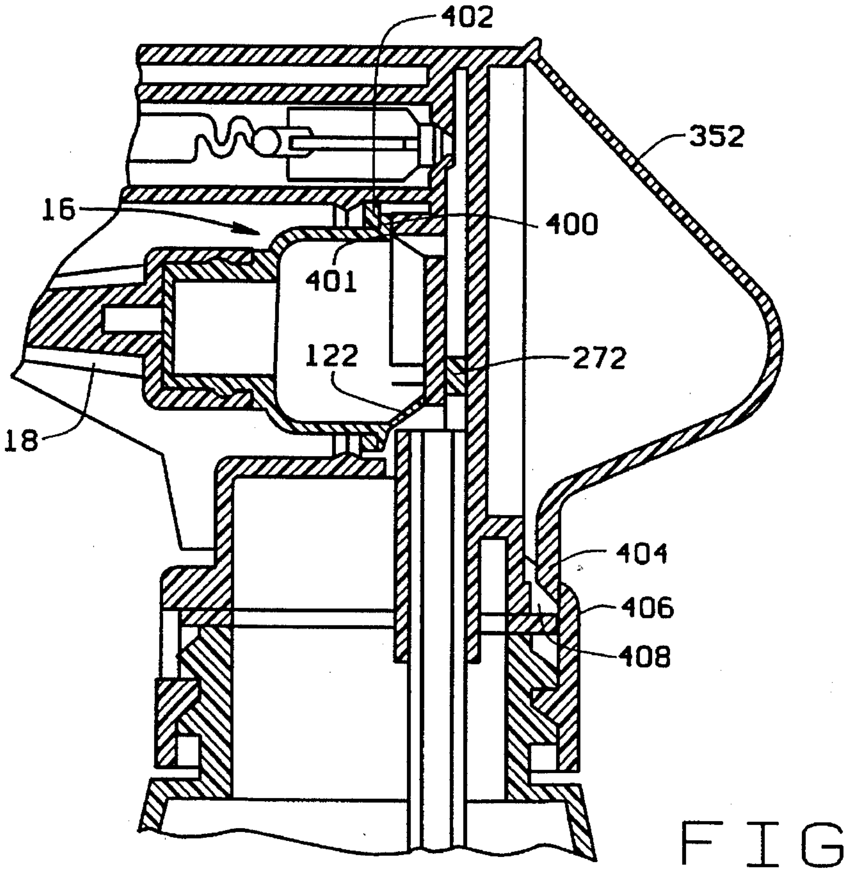
FIG. 8 is a view in section showing an alternate embodiment of the trigger sprayer of FIG. 6.
Figure 13:
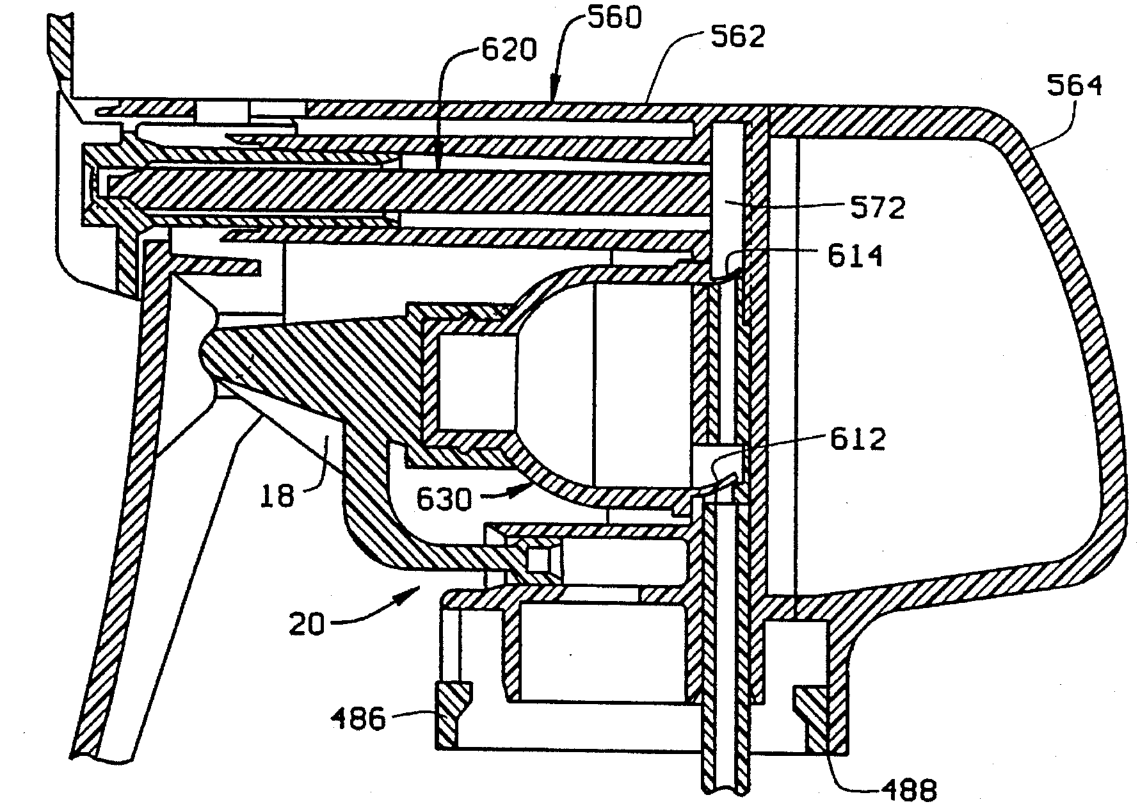
FIG. 13 is a view in section illustrating a further modification of the embodiment of FIG. 12.

FIG. 8 shows a trigger sprayer embodiment of the present invention which is similar to that of FIG. 6 except that the pump element 16 is an elastomeric bulb as shown in FIGS. 1 and 3 with an integrally-formed elastomeric check valve member 122. It also uses a plug 272 as shown in FIG.13. With the embodiment of FIG. 8, the rear end of the bulb has an outwardly-extending annular flange 400 which seats against an annular surface 401 of the housing and is held in place by a snap ring 402.

It is to be understood that while the embodiment shown in FIG. 6 has a threaded closure which holds the rear section 352 in the closed position, the connector portion may also be of the bayonet type integrally formed with the housing as shown in FIG. 8. In such case the rear section 352 is locked in the closed position by snapping the lower end 404 of the rear section past the upper end 406 of the connector until it lodges in a notch 408, similar to the notch 376, at the top of the connector.

Figure 9:
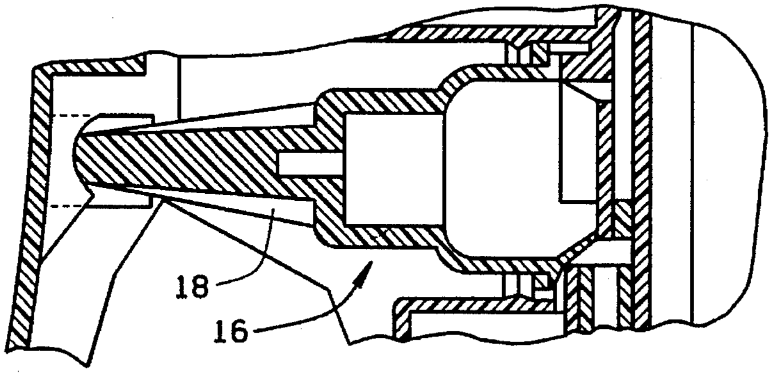
FIG. 9 is a view in section showing an alternate embodiment of the pump element of the trigger sprayer of FIG. 8.

FIG. 9 shows an alternate form of the embodiment of FIG. 8 where the plunger 18 and pump element 16 are integrally formed.

Figure 10:
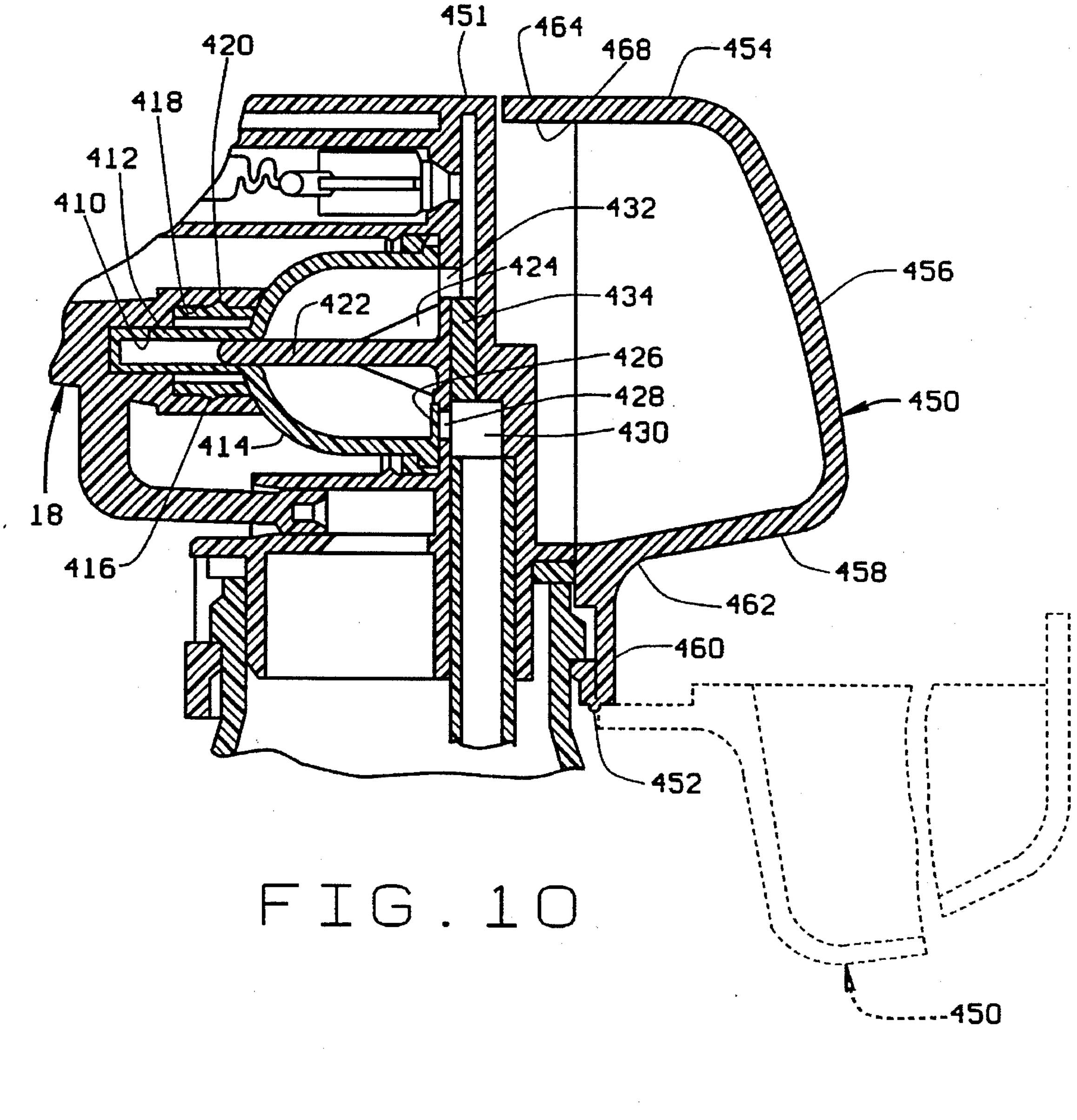
FIG. 10 is a view in section showing another embodiment of the trigger sprayer of the present invention.

FIG. 10 illustrates still another embodiment of the invention which in many respects is similar to those previously described but with certain modifications. In this embodiment the plunger 18 has a deep recess 410 which receives a tubular projection 412 of an elastomeric bulb pump element 414. The pump element also has a forwardly-extending sleeve 416 surrounding the tubular projection 412 and which is secured within a shallower recess 418 in the plunger. The sleeve 416 has an annular shoulder 420 which seats within a complementary annular groove in the plunger to secure the pump element to the plunger. The housing has a forwardly-extending rod 422 which slides within the tubular portion 412 of the elastomeric bulb in telescoping relation. The rod gives structural stability to the pump element as it extends and retracts during operation of the sprayer. The rod 422 is structurally supported with reinforcing ribs 424.

The elastomeric bulb 414 has an elastomeric valve element 426, somewhat similar to the valve element 124 (FIG. 1), which seals an opening 428 from a cavity 430 at the top of the dip tube. The valve element 426 defines a check valve. Another opening 432 communicates the pump element chamber with the cavity 430 to provide a second liquid passage for the flow of liquid from the chamber to the primary valve. An elastomeric plug 434 blocks the direct flow of liquid in the cavity 430 from the dip tube to the primary valve.

This embodiment of the invention also has a rear section 450 of the housing which is pivotally connected to the front section 451 by a living hinge 452. However, in this embodiment the rear section is hinged at the bottom of the housing, rather than at the top as with the embodiments of FIGS. 6 and 8. In FIG. 10 the connector portion for connecting the housing to the neck of the bottle is integrally formed with the housing and is of the bayonet type, the rear section 450 of the housing being hinged at the lower end of the connector portion. The housing is molded with the rear section 450 in the position shown by dashed lines, and then during assembly the rear section is pivoted to the solid line closed position.

The configuration of the rear section 450 is an example of the many configurations that may be used. It has a top wall 454, back wall 456, bottom wall 458, and tail wall 460. A saddle recess 462 is formed between the walls 458 and 460 for ergonomically receiving the web of the hand between the thumb and first finger for operation of the sprayer. The top wall 454 has a portion 464 that extends past the edges of the rear section side walls to overlie the top of the housing front section 451 as shown at 468.

Figure 11:
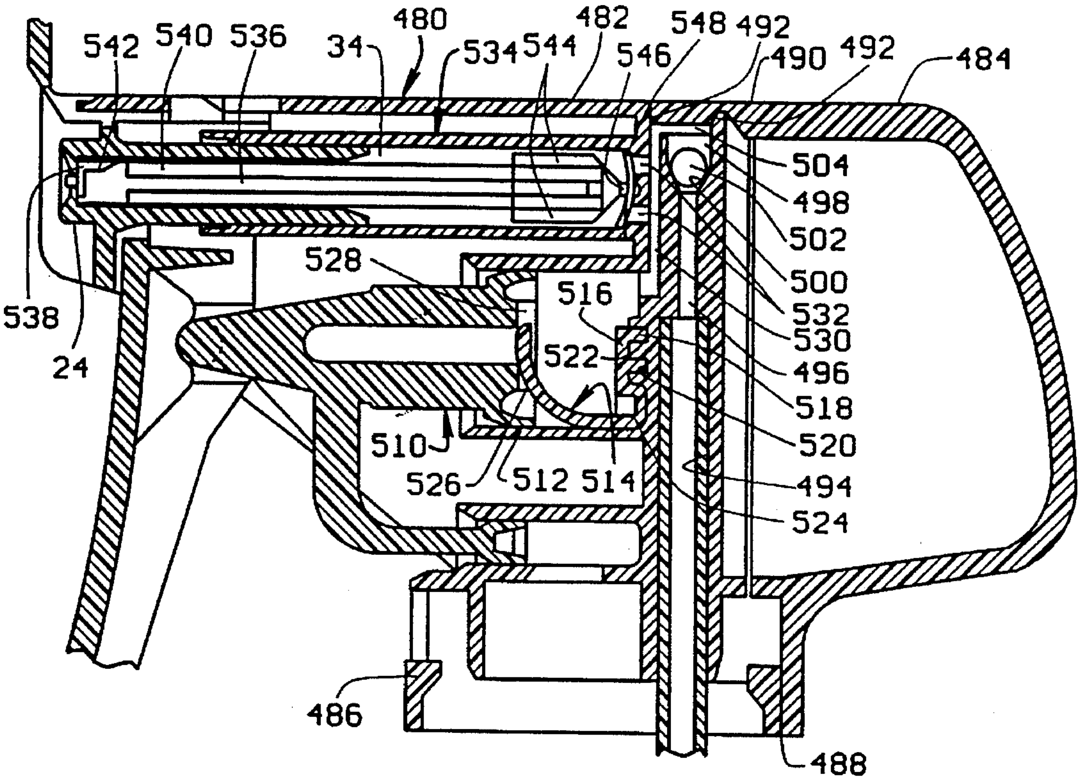
FIG. 11 is a view in section showing another embodiment of the trigger sprayer of the present invention.

FIG. 11 illustrates another embodiment of the invention. The housing 480 has a front section 482 and a rear section 484. The housing has an integrally-formed bayonet connector 486 for connecting the housing to a container. The rear section 484 is pivotally attached at the bottom to the bayonet connector 486 by a living hinge 488 similar to the embodiment of FIG. 10. The upper end of the rear section 484 has a plug portion 490 formed integrally therewith and which has outwardly-extending shoulders 492.

The housing 480 has a vertical cavity 494 which receives the upper end of the dip tube. A fluid passage 496 extends from the upper end of the dip tube to a check valve 498. The check valve comprises a valve seat 500 formed in the housing at the upper end of the passage 496, and a ball valve 502 which is inserted through an opening 504 in the housing above the check valve 498. The rear section 484 of the housing is secured in the closed position as shown in FIG. 11 by snapping the plug portion 490 into the top of the opening 504, the opening having complementary recesses to receive the shoulders 492 in snap engagement.

Hence, during assembly, the housing is molded with the rear section in a horizontal position like the housing of FIG. 10. After the ball valve 502 is inserted through the top opening of the housing, the rear section is pivoted to the closed position and the plug portion 490 snapped into the opening to enclose the ball valve.

In this embodiment the pump element comprises a piston 510 which reciprocates within a cylinder portion 512 formed by the housing. Rather than a metal coil spring as shown in FIGS. 5, 6, and 7, in this embodiment an elastomeric spring 514 biases the piston in the extended position shown in FIG. 11. The elastomeric spring 514 is of integral construction and has a base 516 which forms an annular sleeve 518. The sleeve fits within an annular groove 520 in the housing. The annular groove defines a central cylindrical portion 522 of the housing which fits within the sleeve. The elastomeric spring has a radial portion 524 seated within a complementary groove in the housing, and a curved forwardly-projecting portion 526 extending therefrom with the forward end lodged within a groove 528 formed in the rear face of the piston. The resilient elastomeric arm portion 526 of the spring element biases the piston in the extended position. The elastomeric spring element represents a cost savings in a trigger sprayer utilizing a reciprocating piston pump element.

A liquid passage 530 extends from the pump chamber to passages 532 formed in the housing at the rear of the cavity 34 which houses a spinner assembly 534. The spinner assembly is of integral molded construction with the main portion 536 of the assembly extending nearly the full length of the cavity and being relatively rigid. The front face 538 of the spinner assembly is formed in a conventional manner with tangential grooves and a spinner recess or swirl chamber for imparting a spinning motion to the liquid before exiting through the nozzle orifice to produce a spray pattern. The main portion has suitable slots 540, 542 to allow the flow of liquid through the cavity toward the orifice.

At the rear of the spinner portion 536 there are radial fins 544 which fit in close proximity to the wall of the cavity to center the rear of the spinner portion 536. An axial hub 546 extends to the rear and has a flexible diaphragm disc 548 molded integrally with the hub. With the spinner assembly mounted in the cavity 34, the diaphragm disc overlies the openings 532. The length of the spinner assembly 534 relative to the cavity 34 is such that a preload is applied to the diaphragm disc to give it a dish-shaped configuration as shown in FIG. 11 after the spinner assembly is mounted in the cavity. The spinner assembly either may be molded with the diaphragm disc flat, or in a dish-shaped configuration.

To assemble the spinner assembly, the spinner assembly 534 is inserted into the cavity 34 from the front of the housing, and then the nozzle assembly 24 is attached to the housing to capture the spinner assembly within the cavity.

In operation, when the trigger is pulled the liquid pressure causes the diaphragm disc 548 to flex so that liquid may flow from the chamber, through the passage 530, openings 532, and past the diaphragm disc and into the cavity 34. Upon releasing the trigger there is a reduction of pressure in the passage 530 and openings 532 such that the diaphragm disc seals the openings 532 to prevent the passage of liquid therethrough. Instead, liquid is drawn from the container, through the dip tube and check valve 498, passage 530, and into the pump chamber.

Figure 12:
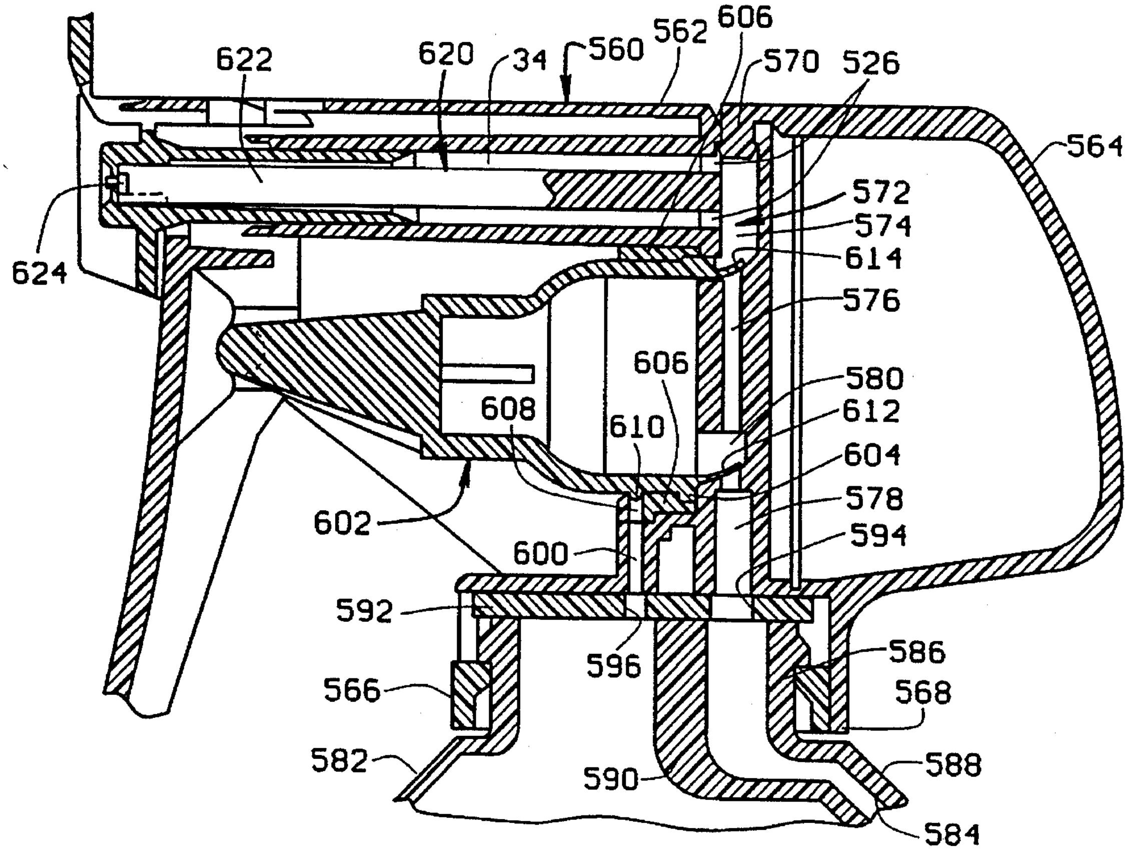
FIG. 12 is a view in section showing another embodiment of the trigger sprayer of the present invention.

FIG. 12 illustrates another embodiment of the invention. Like the embodiment of FIG. 11, the housing 560 has a front section 562 and a rear section 564 pivotally connected to the bayonet connector portion 566 of the housing by a living hinge 568. The upper end of the rear section 564 has a plug portion 570 similar to the plug portion 490 of the embodiment of FIG. 11. The plug portion 570 snaps into the top of a vertical cavity 572 formed in the housing. The cavity has an upper portion 574, a middle portion 576, and a lower portion 578. Between the lower portion 578 and middle portion 576 is an enlarged recess area 580.

In this described embodiment, the container 582 has a passage 584 which leads from the bottom of the container to the top of the neck 586. The passage is located within integrally-formed walls 588, 590 of the container. A gasket 592 is located between the top of the neck and the sprayer housing and has an opening 594 in alignment with the top of the passage 584. The gasket also has an opening 596 located outwardly of the wall 590 so that the opening 596 does not communicate with the passage 594 with liquid in the container.

The lower portion 578 of the cavity 572 is in alignment with the opening 594 in the gasket and the passage 584. The housing has a vent opening 600 in alignment with the opening 596 in the gasket.

The pump element is an elastomeric bulb 602 similar to that of FIG. 9. The rear of the bulb has an annular shoulder 604 which is held in sealing engagement against the housing by a ring 606. The ring has an opening 608 in alignment with the vent opening 600 in the housing. The bulb 602 has a bead 610 which seals the top of the opening 608 when the bulb is in the extended position shown in FIG. 12.

At the rear of the bulb 602 is a lower integrally-formed resilient flap 612 which overlies the opening at the top of the lower portion 578 of the cavity 572. The elastomeric bulb 602 also has an upper integrally-formed flap portion 614 which overlies the opening at the top of the middle portion 576 of the cavity 572. The lower flap 612 functions as a check valve, and the upper flap 614 functions as a primary valve.

In this embodiment of the invention the spinner assembly 620 is formed integrally with the housing. The housing has an elongated portion 622 which extends the length of the cavity 34. The front face 624 of the portion 622 is formed with tangential grooves and a spinner recess, as is conventional, for imparting a spinning motion to the liquid prior to exiting through the nozzle orifice to produce a spray pattern. The housing has openings 526 for the passage of liquid from the cavity 572 into the cavity 34. Hence, in this embodiment the primary valve is not associated with the spinner assembly, making it possible for the spinner assembly to be formed integrally with the housing.

In operation, when the trigger is pulled to retract or collapse the bulb 602, the liquid pressure causes the valve 612 to close and the valve 614 to open so that liquid is pumped from the bulb chamber, through the middle and upper portions of the cavity 572, and through the openings 526 into the cavity 34 for dispensing the liquid. When the trigger is released, the bulb extends such that the reduced liquid pressure opens the valve 612 and closes the valve 614 to draw liquid from the container passage 584, through the opening 594 in the gasket, through the lower portion 578 of the cavity 572, and the check valve 612 into the bulb chamber. Also, when the trigger is pulled the bead portion 610 of the bulb becomes unsealed from the opening 608 so that air is allowed to pass through the openings 608, 600, 596 to vent the container. When the trigger is released and the bulb is extended as shown in FIG. 12, the bead 610 seals the opening 608 so that liquid cannot leak from the container.

FIG. 13 shows a modification of the embodiment of FIG. 12 where the front section 562 of the housing 560 is closed at the top of the cavity 572, although as with the embodiment of FIG. 12, the rear section 564 is pivotally secured at the bottom to the integrally-formed bayonet connector-486 by the living hinge 488. The spinner assembly 620 is the same as in FIG. 12. The sprayer of FIG. 13 has a bulb-type pump element 630 similar to the bulb 602 of FIG. 12, but formed in two pieces with a plunger 18 and vent assembly 20 similar to the embodiments of FIGS. 1 and 3. The valve arrangement is similar to FIG. 12 incorporating an elastomeric bulb having integrally-formed valve elements 612, 614.

Figure 14:
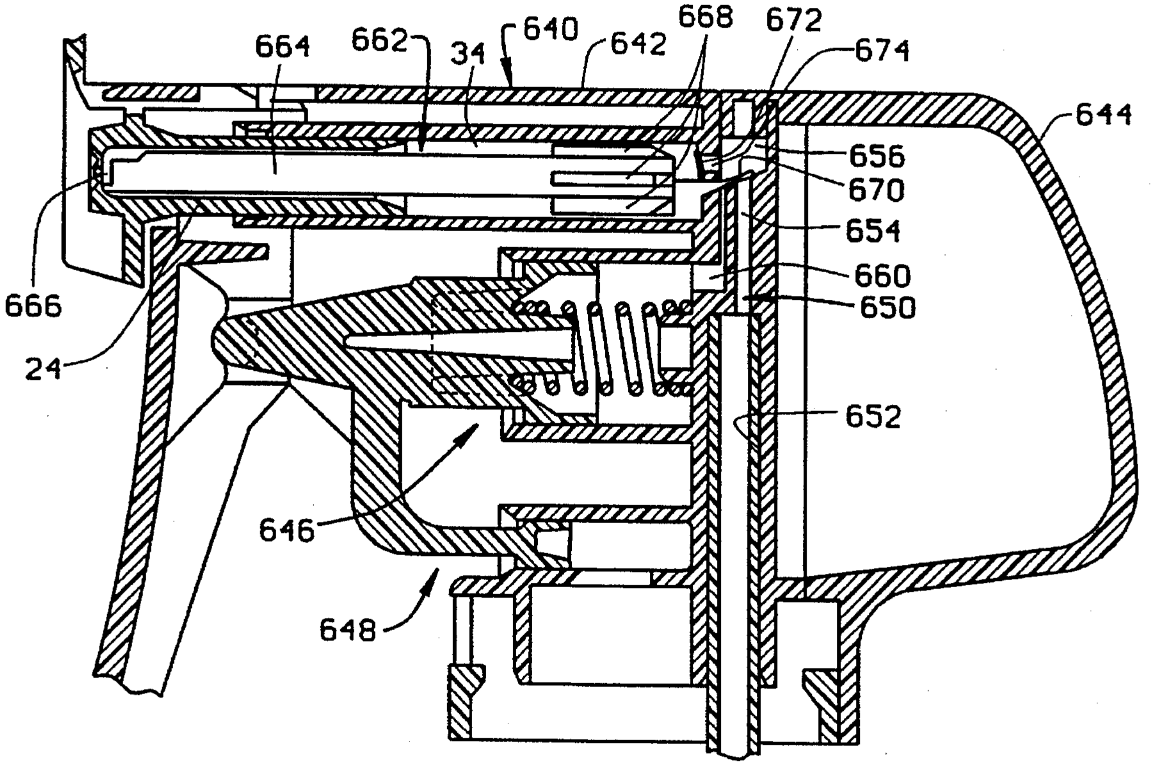
FIG. 14 is a view in section showing another embodiment of the trigger sprayer of the present invention.

FIG. 14 illustrates another embodiment of the invention where the housing 640 has front and rear sections 642, 644 similar to the embodiment of FIG. 12, and has a pump element 646 and vent assembly 648 similar to FIG. 6.

The housing has a vertical cavity 650, the lower portion 652 of the cavity receiving the upper end of the dip tube. The middle portion 654 extends from the upper end of the dip tube to the upper portion 656. The housing also has a liquid passage 660 extending from the pump chamber to the upper portion 656 of the cavity 650.

The spinner assembly 662 has a main elongated body portion 664 extending nearly the full length of the cavity 34 with a spinner face 666 at the front end as is conventional. The rear of the body portion 664 has radial fins 668 to center the rear of the spinner assembly within the cavity. The rear of the spinner assembly also is formed with a first flexible flap portion 670 which overlies the top of the middle portion 654 of the vertical cavity 650 to define a check valve, and a second flexible flap portion 672 which overlies an opening 674 formed in the housing and which communicates the upper portion 656 of the cavity 650 with the cavity 34. The entire spinner assembly 662, including the flaps 670, 672, is integrally molded.

In assembly, the spinner assembly 662 is inserted into the cavity 34 from the front of the housing, and then the nozzle assembly 24 is secured to the front of the housing to trap the spinner assembly within the cavity.

In operation, when the trigger is pulled, the high liquid pressure causes the check valve 670 to close and the primary valve 672 to open to pump liquid from the pump chamber, through the liquid passage 660, past the primary valve 672, and into the cavity 34 for dispensing the liquid. When the trigger is released, the low liquid pressure causes the primary valve 672 to close, and the check valve 670 to open to draw liquid from the container, through the cavity 650, check valve 670, and the passage 660, into the pump chamber. In this embodiment of the invention, both the check valve and primary valve are associated with the spinner assembly.

With all of these embodiments, the entire housing is integrally molded of a suitable plastic material such as polypropylene. Other components of the sprayer assembly, particularly those that perform a sealing function, are molded of a suitable plastic material such as polyethylene. One such material is HYTREL which is a product of Dupont Co.

While each embodiment has been described with certain combined features of the invention, it is to be understood that various features of each embodiment may be combined with features of the other embodiments as well.

While the present invention has been described by reference to specific embodiments, it should be understood that modifications and variations of the invention may be constructed without departing from the scope of the invention defined in the following claims.

What is claimed is:

1. A liquid dispenser apparatus comprising:

a sprayer housing a cavity extending longitudinally therethrough, the cavity having a center axis with a liquid inlet opening at one end of the cavity and a liquid discharge orifice at an axially opposite end of the cavity;

a flexible diaphragm disc valve is positioned in the cavity overlying the inlet opening, the flexibility of the disc valve enables the disc valve to move away from the inlet opening and permit a flow of liquid through the inlet opening into the cavity in response to a positive liquid pressure being exerted on the disc valve from the inlet opening, and the flexibility of the disc valve enables the disc valve to move toward the inlet opening and overlie the opening blocking a flow of liquid through the inlet opening from the cavity in response to a negative liquid pressure being exerted on the disc valve from the inlet opening; and a main body portion connected to said disc valve, the body portion extending longitudinally through the cavity and fitting in close proximity with an interior surface of the cavity to center the disc valve relative to the center axis of the cavity.

2. The apparatus of claim 1, wherein:

the disc valve has a center and a peripheral edge surrounding the center, and the center of the disc valve remains stationary relative to the inlet opening while the peripheral edge of the disc valve moves away from the inlet opening in response to a positive liquid pressure being exerted on the disc valve, and while the peripheral edge of the disc valve moves toward the inlet opening and overlies the inlet opening in response to a negative liquid pressure being exerted on the disc valve.

3. The apparatus of claim 1, wherein:

the body portion exerts an axial preload force on the disc valve giving the disc valve a concave configuration overlying the inlet opening.

4. The apparatus of claim 1, wherein:

the main body portion has a swirl chamber on an end of the main body portion axially opposite the disc valve.

5. The apparatus of claim 2, wherein:

the sprayer housing has an abutment positioned in the cavity coaxially with the cavity center axis and adjacent the inlet opening, and the center of the disc valve engages against the abutment.

6. The apparatus of claim 5, wherein:

the abutment has a recess formed therein and an axial hub projects from the center of the disc valve and engages in the recess to center the disc valve relative to the cavity with the peripheral edge of the disc valve surrounding the inlet opening.

7. The apparatus of claim 4, wherein:

the disc valve, the main body portion and the swirl chamber are all integrally formed as a single component part of the apparatus.

8. A valve assembly for use in a sprayer type dispenser for dispensing a liquid, the dispenser having a housing and an interior surface defining a discharge passage extending longitudinally through the housing along a center axis from an upstream end to a downstream end, the passage having an inlet opening at the upstream end of the passage and a discharge opening at the downstream end of the passage, the valve assembly comprising:

a body extending longitudinally through the passage from a first end adjacent the inlet opening to a second end downstream of the first end when the valve assembly is positioned within the discharge passage of the dispenser housing, the body fitting in close proximity with the interior surface of the passage to center the body relative to the center axis of the passage; and a flexible disc valve integrally formed with the body, the disc valve being positioned to overly the inlet opening when the valve assembly is positioned within the discharge passage of the dispenser housing, the flexibility of the disc valve enabling a peripheral edge portion of the disc valve to move away from the inlet opening to permit a flow of liquid through the inlet opening into the passage in response to a positive liquid pressure being exerted on the disc valve from an upstream side of the inlet opening, and the flexibility of the disc valve enabling the peripheral edge portion of the disc valve to move toward and overlie the inlet opening blocking a flow of liquid through the inlet opening from the passage in response to a negative liquid pressure being exerted on the disc valve from the upstream side of inlet opening.

9. The valve assembly of claim 8 wherein:

the peripheral edge portion of the disc valve surrounds a center portion of the disc valve, the center portion remaining stationary relative to the inlet opening while the peripheral edge moves away from the inlet opening to permit a flow of liquid into the passage, and while the peripheral edge moves toward and overlies the inlet opening to block a flow of liquid through the inlet opening.

10. The valve assembly of claim 8 wherein:

the disc valve and the first end of the body are joined to one another at the center axis when the valve assembly is positioned within the discharge passage of the dispenser housing.

11. The valve assembly of claim 8 wherein:

the body extends from the inlet opening to the discharge opening when the valve assembly is positioned within the discharge passage of the dispenser housing.

12. The valve assembly of claim 11 wherein:

the valve assembly is longer than the discharge passage to bias the disc valve against the inlet opening when the valve assembly is positioned within the discharge passage of the dispenser housing.

13. The valve assembly of claim 11 wherein:

the body exerts an axial force on the disc valve to bias the disc valve against the inlet opening when the valve assembly is positioned within the discharge passage of the dispenser housing.

14. The valve assembly of claim 8 wherein:

the body includes a plurality of radially extending fins configured to engage the interior surface of the discharge passage and center the disc valve at the inlet opening when the valve assembly is positioned within the discharge passage of the dispenser housing.

15. A trigger sprayer apparatus for dispensing liquid from a container, the apparatus comprising:

a dispenser housing configured to be connected to the container, the dispenser housing having a pump chamber therein, a discharge nozzle and a liquid passage communicating the pump chamber with the discharge nozzle; and, a flexible disk-shaped valve positioned in the passage, the disk-shaped valve preventing a flow of liquid through the passage from the nozzle to the pump chamber and the disk-shaped valve being constructed to flex when subjected to liquid under pressure in the pump chamber to permit a flow of liquid through the passage from the pump chamber to the nozzle, the disk-shaped valve has opposite convex and concave surfaces, and the convex surface is positioned in the passage facing in an upstream direction toward the pump chamber.

16. The apparatus of claim 15, wherein:

the disk-shaped valve is constructed so that a portion of the disk-shaped valve flexes in response to being subjected to liquid under pressure in the pump chamber while another portion of the disk-shaped valve remains stationary in the passage.

17. the apparatus of claim 15, wherein:

a valve seat is positioned in the passage and the disk-shaped valve engages with the valve seat in an at rest position of the disk-shaped valve relative the valve seat, and the disk-shaped valve is constructed so that a portion of the disk-shaped valve will be caused to flex relative to the passage and away from the valve seat when the disk-shaped valve is subjected to liquid under pressure in the pump chamber.

18. The apparatus of claim 17 wherein:

the disk-shaped valve is constructed so that another portion of the disk-shaped valve will remain stationary relative to the passage when the portion of the disk-shaped valve is caused to flex relative to the passage and away from the valve seat.

* * * * *